UNITED STATES PATENT OFFICE.

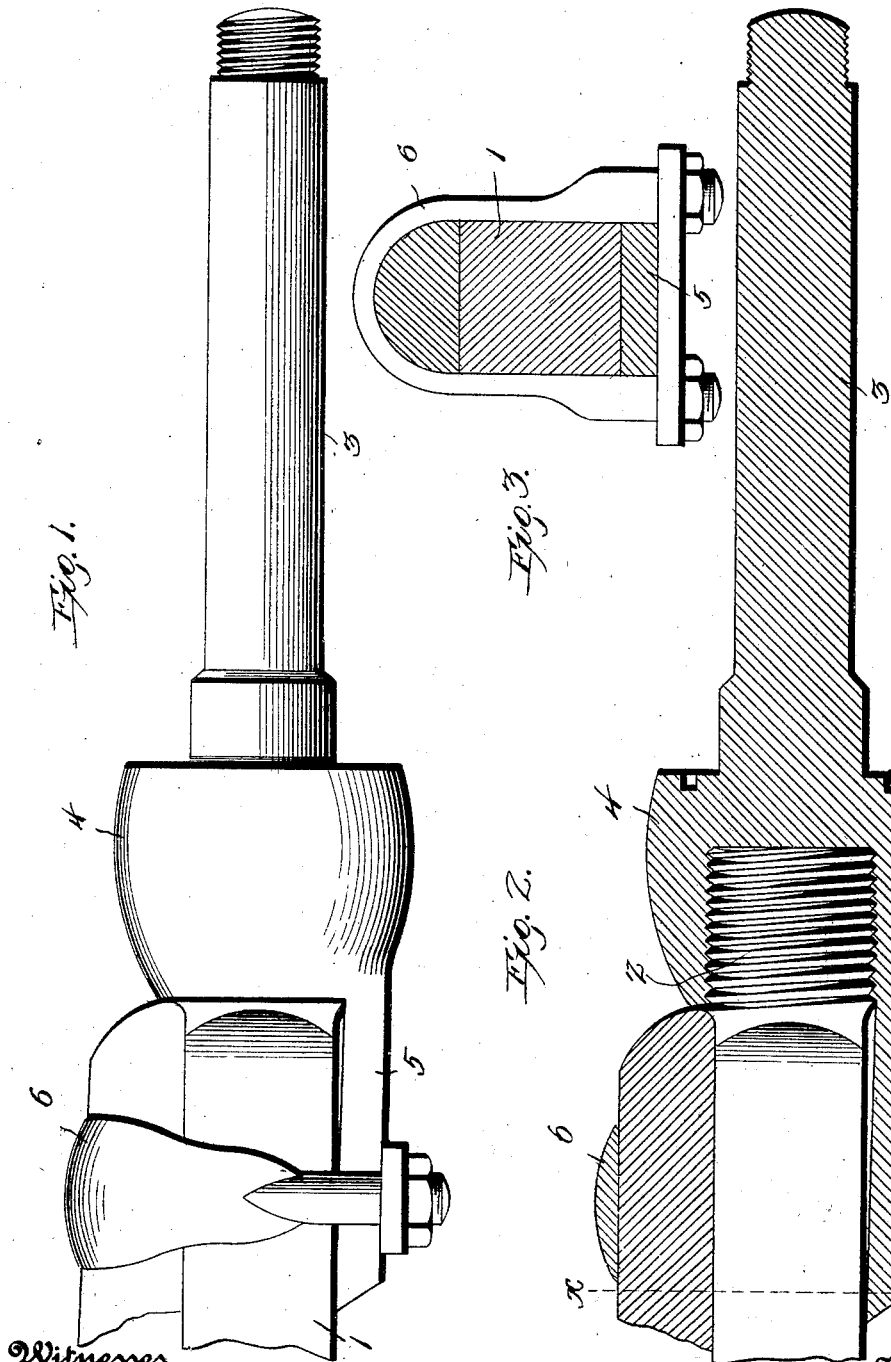

HARDY HESTAND AND ARTHUR R. MATTHEWS, OF DUNDEE, TEXAS.

VEHICLE-AXLE.

SPECIFICATION forming part of Letters Patent No. 707,845, dated August 26, 1902.

Application filed March 6, 1902. Serial No. 96,953. (No model.)

*To all whom it may concern:*

Be it known that we, HARDY HESTAND and ARTHUR R. MATTHEWS, citizens of the United States, residing at Dundee, in the county of Archer and State of Texas, have invented certain new and useful Improvements in Vehicle-Axles; and we do declare the following to be a full, clear, and exact description of the invention, such as will enable others skilled in the art to which it appertains to make and use the same.

The invention relates to vehicle-axles.

The object of the invention is to provide a vehicle-axle with a removable spindle, whereby spindles of different lengths may be connected to the axle to change the gage of the vehicle—that is, from a narrow-gage vehicle into a wide-gage vehicle, and vice versa—and also permit of the replacement of an old worn spindle by a new one.

With this and other objects in view, which will readily appear as the nature of the invention is better understood, the same consists in certain novel features of construction and combination and arrangements of parts, which will be hereinafter fully described, defined in the appended claim, and illustrated in the accompanying drawings, in which—

Figure 1 is a side elevation of the end of an axle, illustrating the application of the invention. Fig. 2 is a longitudinal vertical sectional view. Fig. 3 is a cross-sectional view on the line $x\,x$ of Fig. 2.

In the drawings, 1 denotes the end of the axle, provided with an enlarged head 2, which is screw-threaded.

3 denotes the axle-spindle, preferably made of steel and provided at its inner end with an enlarged cup 4, interiorly threaded and provided with a rearwardly-projecting arm 5, adapted to be secured to the axle by a clip 6. The outer screw-threaded end of the axle is enlarged, so as to permit the arm when the cup is being screwed upon the enlarged screw-threaded end to freely pass the square corners of the axle. When the clip is applied, the arm is drawn close to the under side of the axle by the nuts of the clip, and in exerting its spring action said arm forces the tie-plate against the nuts and holds it in frictional engagement therewith. It will thus be seen that the spring-arm, in addition to serving as a means for preventing the unscrewing of the spindle from the axle, also serves as a nut-lock for the nuts of the clip, as the spring energy of the arm is exerted to tightly force the tie-plate of the clip against the nuts thereof. When the spindle becomes worn, it may be easily and quickly removed and a new one substituted by simply loosening the clip and unscrewing the spindle. By having two sets of spindles on hand of different lengths the vehicle may be converted from a wide-gage to a narrow-gage vehicle, or vice versa.

From the foregoing description, taken in connection with the accompanying drawings, the construction, operation, and advantages of our improved vehicle-axle will, it is thought, be readily apparent without requiring a more extended explanation.

Various changes in the form, proportion, and the minor details of construction may be resorted to without departing from the principle or sacrificing any of the advantages of this invention.

Having thus described the invention, what we claim as new, and desire to secure by Letters Patent, is—

The combination with a vehicle-axle provided with an enlarged screw-threaded end; of a spindle provided with an enlarged internally-threaded cup to be screwed upon said end, and a spring-arm projecting inwardly from said spindle and, in the act of screwing the spindle to the axle, adapted to freely pass the corners of the axle, and a clip for clamping the arm into engagement with the axle, substantially as described.

In testimony whereof we have hereunto set our hands in presence of two subscribing witnesses.

HARDY HESTAND.
ARTHUR R. MATTHEWS.

Witnesses:
M. J. WICKER,
A. E. DRUMMOND.